May 6, 1947.  E. K. NORGREN  2,420,147
MEANS AND METHOD FOR MAKING METALLIC CARTRIDGE BELT LINKS
Filed March 20, 1942   11 Sheets-Sheet 1

Inventor
Eric K Norgren
By Charles W. Hills Atty.

May 6, 1947. E. K. NORGREN 2,420,147
MEANS AND METHOD FOR MAKING METALLIC CARTRIDGE BELT LINKS
Filed March 20, 1942 11 Sheets-Sheet 2

Inventor
Eric K. Norgren.
Charles W. Hills Attys.

May 6, 1947. E. K. NORGREN 2,420,147
MEANS AND METHOD FOR MAKING METALLIC CARTRIDGE BELT LINKS
Filed March 20, 1942. 11 Sheets-Sheet 5

Inventor
Erick Norgren
by Charles W. Hills Attys.

May 6, 1947. E. K. NORGREN 2,420,147
MEANS AND METHOD FOR MAKING METALLIC CARTRIDGE BELT LINKS
Filed March 20, 1942 11 Sheets-Sheet 8

Inventor
Erick Norgren.
by Charles W. Hills Attys.

Patented May 6, 1947

2,420,147

UNITED STATES PATENT OFFICE 2,420,147

MEANS AND METHOD FOR MAKING METALLIC CARTRIDGE BELT LINKS

Eric K. Norgren, Chicago, Ill., assignor, by mesne assignments, to United States Government, as represented by the Secretary of War and his successors in office Application March 20, 1942, Serial No. 435,452

8 Claims. (Cl. 59—35)

My invention relates to the manufacture of metallic cartridge belt links of the type disclosed in Laystrom Patent No. 2,232,071, dated February 18, 1941. More particularly, the invention involves an improved method, and improved die structure for carrying out the method, for progressively forming links from a band or ribbon of sheet metal, with the embryo links extending full width of the band, and with the formation involving a minimum amount of scrap metal.

An important object of the invention is to provide an arrangement in which, during progressive feed of the metal band through a portion of the entire die structure, the link loop forming tongues remain substantially flat in the feeding plane, with the exception of slight indentations or deflections at certain parts of the embryo links, and in which arrangement the flat embryo links are severed from the band after alignment in another portion of the die structure in which the flat body and tongues of the embryo links are progressively deflected and brought to their final circular shape and form.

A further object is to provide a die structure arrangement in which the sheet metal band moves on one of its edges in a vertical plane through the first portion of the die structure, and the embryo flat link is severed from the band and delivered to the other portion of the die structure for progressive lateral deflection of the link body and tongues into circular form while the link progresses axially downwardly, the finished links being ejected downwardly from the die structure.

A further object is to provide in the embryo flat link, before it reaches the loop forming part of the die structure, a transverse indentation or recess which, when the embryo link has been shifted into the loop forming part of the die structure and is being severed from the band, is engageable by holding means for holding the link accurately aligned for formation of its tongues into the link loops during passage through the loop forming part of the die structure.

In addition to the features enumerated above, the invention embodies a number of other features of construction, arrangement, and operation, all of the various features being embodied in the structure shown on the drawings, in which:

Figure 1 is a plan view of the entire die structure and the driving and timing means; Figure 1 also showing the end portion of the feed mechanism for the band from which the links are to be formed;

Figure 28a is a view similar to Figure 28 but showing the die assembly open;

Figure 1:
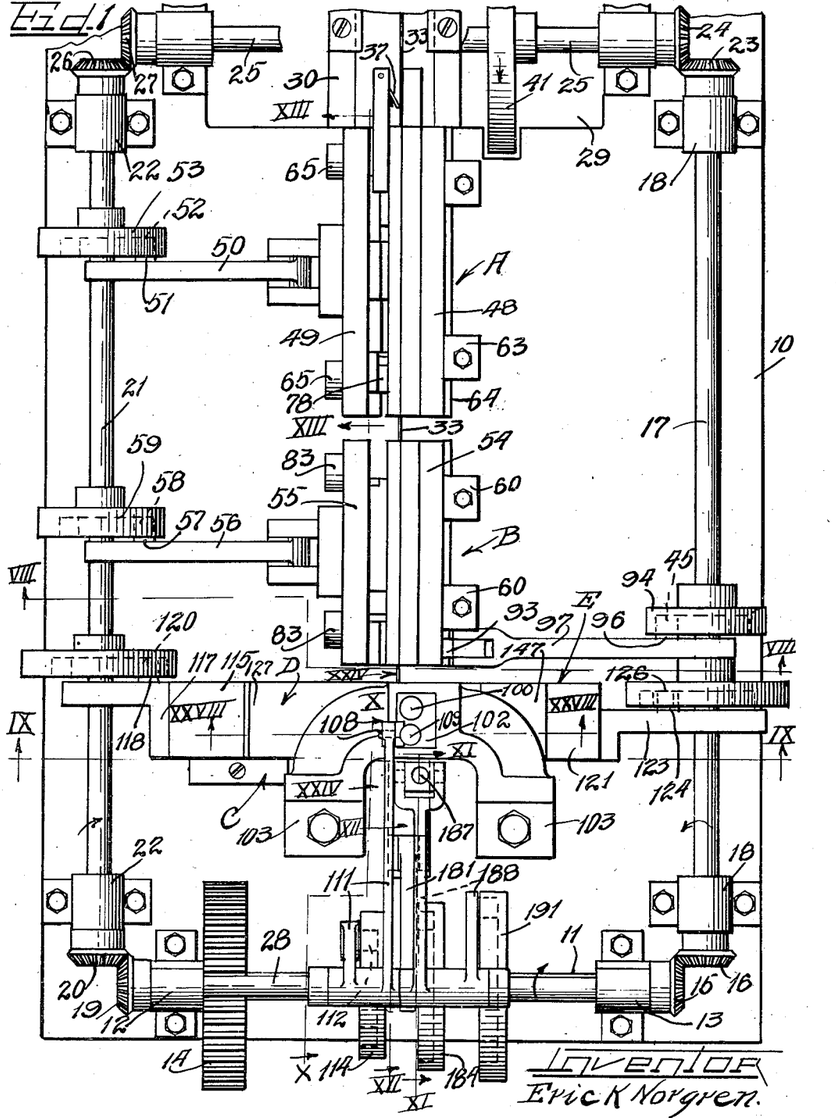

Referring to Figure 1, 10 is a bedplate or base on which the various parts of the die structure are mounted. A first die assembly A and a second die assembly B are mounted in longitudinal alignment along the center line of the bed 10, and a third die assembly C is located in front of the assembly B. Extending along the front portion of the bed is a drive shaft 11 journaled at its ends in bearing pedestals 12 and 13 near the bottom thereof, the shaft supporting a gear 14 for connection with a driving source, such as an electric motor (not shown). The shaft at its right end has a beveled gear 15 meshing with a gear 16 on the front end of the shaft 17 extending longitudinally along the right side of the bed and journaled at its ends in bearings 18. The left end of the drive shaft supports a gear 19 meshing with the gear 20 on the shaft 21 extending longitudinally along the left side of the bed and journaled in bearings 22. The shaft 17 has the gear 23 meshing with the gear 24 on shaft 25, the shaft 21 having the gear 26 meshing with the gear 27 on the shaft 25. Supported by and extending between the upper ends of the pedestals 12 and 13 is a shaft 28 on which is mounted a number of driving members operable by cams on the drive shaft 11, which will be referred to more in detail later.

Figure 2:
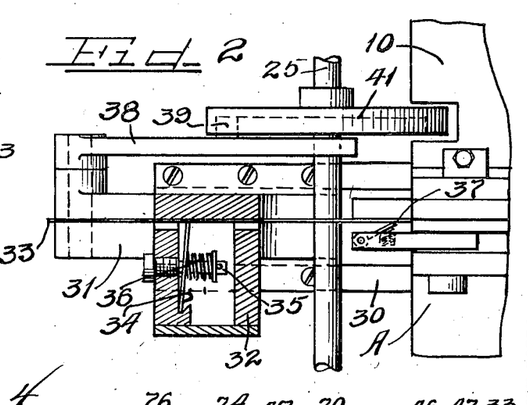
Figure 2 is a plan view of the feed mechanism partly in section on plane II—II of Figure 3.
Figure 3:
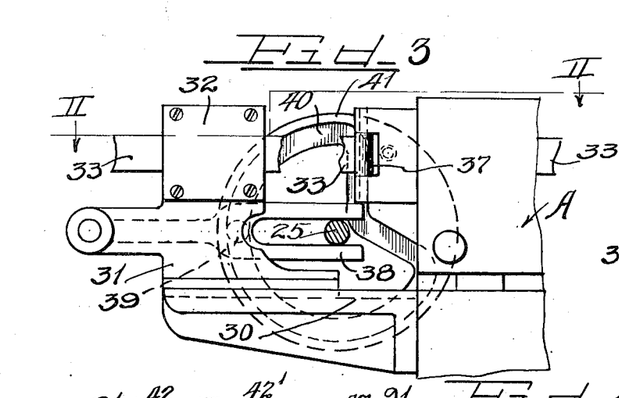
Figure 3 is a side view of the feed mechanism.

The feed mechanism for the band from which the links are to be formed is shown on Figures 2 and 3. It is located at the rear of the bed and projects into the recess 29 in the bed for alignment with the first die assembly A. Any suitable feed mechanism may be used. As shown, it comprises a supporting frame or bracket 30 on which a slider 31 is operable and carries a housing 32 through which extends the metal band 33 from which the links are to be formed, the band traveling on edge in a vertical plane. Within the housing 32 is a gripper plate 34 fulcrumed at its outer end and receiving a post 35 on which is a spring 36 which urges the inner end of the plate against the band 33 so that when the slider 31 is shifted inwardly, the band will be fed through the die structures A and B. A spring actuated detent tongue 37 is arranged to grip and clamp the band and hold it against return or outward movement after feed thereof by the blade 34.

The slider 31 has the actuating arm 38 fulcrumed thereto at its outer end and slotted at its inner end to receive the shaft 25, a cam pin or roller 39 on the arm engaging in the camway 40 of the cam 41 mounted on the shaft 25. The slider with the feed plate 34 is therefore shifted back and forth in timed relation with other parts of the die structure for progressive feeding in of the blank from which the links are to be formed.

The link which is to be manufactured is best shown on Figures 5, 6, 7, and 37. It comprises a transversely extending body part 42 from one edge of which at the ends thereof extend the loops 43 and 44 for supporting a cartridge, and from whose other edge at the middle portion thereof extends the loop 45, the loop 45, in the assembly of a belt, engaging between the loops 43 and 44 of an adjacent link to receive the body of the cartridge, the cartridges thus forming hinge pins for the assembled belt.

Figure 4:
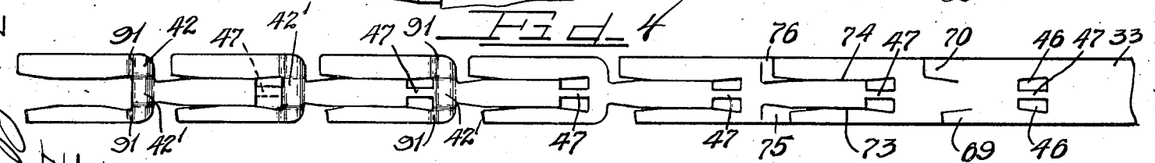
Figure 4 is a plan view of a length of sheet metal band showing progressive die formation of the links in flat form preparatory to final forming of the link loops.

Figure 4 shows the progressive stages of formation of the link in the die assemblies A and B. As the band progresses through the die structure, pairs of holes 46 are punched therethrough leaving between them a narrow longitudinally extending portion 47 which serves to tie the embryo links together until they are cut off for reception in the third die structure C, the holes 46 serving primarily to receive die fingers for holding the band accurately aligned while passing through the die structures A and B. The halves of the die assemblies A and B are moved together and apart by cam structure which will be referred to more in detail later, and during passage of the band through the die assembly A, a complete link is progressively formed, with the exception of deflections and indentations which are formed therein during passage of the band through the die assembly B. In the assembly B, the body 42 of the link is given a transverse curvature with a radius that of the finished loop 45 and, at the same time, the central portion 42' of the body, which forms the beginning of the loop 45, is offset laterally as will be clearly shown in the detailed description of the die assembly B. The final operation in the assembly B cuts out the tie 47 between the ends of the completed link and the following link, the severed link being then in position for reception in the third die assembly. During passage of the band 33 through the die assemblies A and B, the embryo links, except for the transverse curvature and deflection of the body parts, remain substantially flat in a vertical plane, the forming of the loops into circular form being accomplished entirely in the third die assembly through which the received links travel downwardly.

Figure 8:
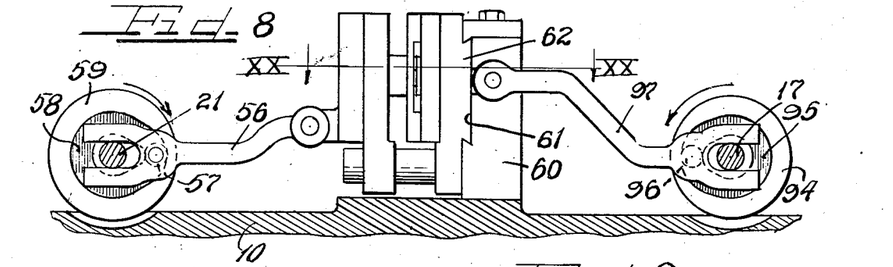
Figure 8 is a section on plane VIII—VIII of Figure 1.

The die structure A has the stationary die element 48 and the movable punch element 49 from which extends a cam arm 50 (Figure 1) whose end is bifurcated to receive the shaft 21 to be guided thereon and which has the cam pin 51 engageable in the camway 52 in the cam disk 53 mounted on the shaft 21. The die assembly B has the stationary die element 54 and the movable punch element 55 connected by the cam arm 56 from which the cam pin 57 extends into the camway 58 in the face of the cam disk 59 on the shaft 21. The cams 53 and 59 effect simultaneous movement of the punch elements 49 and 55 toward and away from the stationary elements 48 and 54. As best shown on Figures 1 and 8, posts 60 extend up from the bed 10 which provide dovetail guideways 61 for receiving the dovetail 62 on the die element 54 of the assembly B. Other posts 63 have guideways for receiving the dovetail 64 on the die element of the assembly A, the die elements being thus securely held in proper position.

Figure 13:
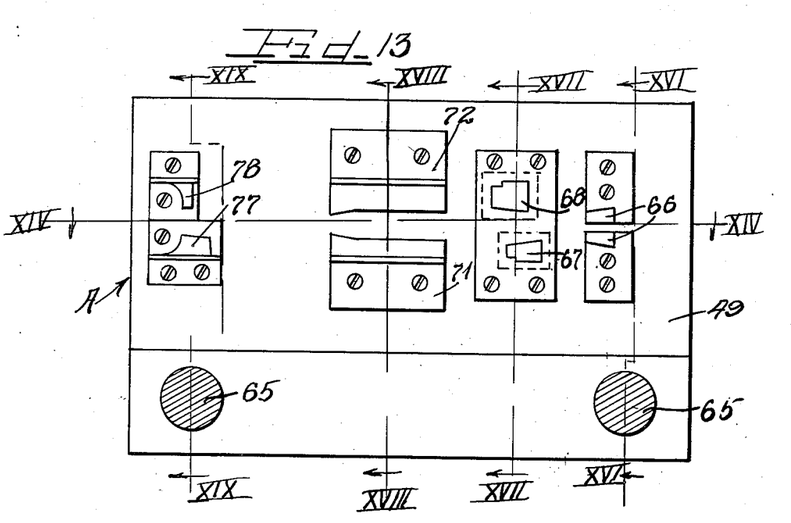
Figure 13 is an enlarged section on plane XIII—XIII of Figure 1.
Figure 16:
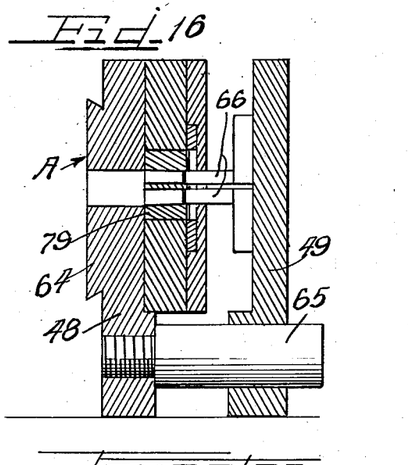
Figure 16 is a section on plane XVI—XVI of Figures 13 and 15.
Figure 17:
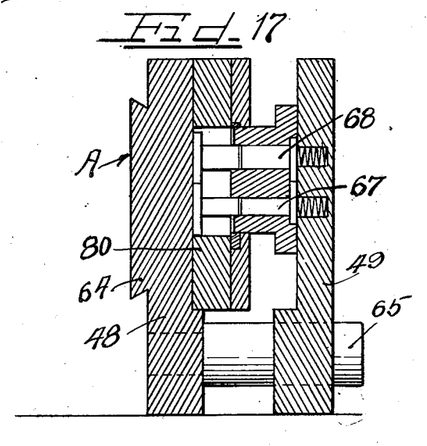
Figure 17 is a section on plane XVII—XVII of Figures 13 and 15.

The die assembly A is shown in detail on Figures 13 to 19. The stationary element 48 has guide bars 65 extending therefrom near the bottom thereof on which the movable or punch element 49 is mounted to slide by the operation of the cam 53. Figures 13 and 16 show the pair of punch members 66 which form the holes 46 in the band 33 which define the ties 47 (Figure 4) for coupling the embryo links together on their travel through the die structures A and B. Figures 13 and 17 show the punch members 67 and 68 which cut the band to form the ends of the tongues for the loops 44 and 43 of the link, as indicated at 69 and 70 on Figure 4.

Figure 18:
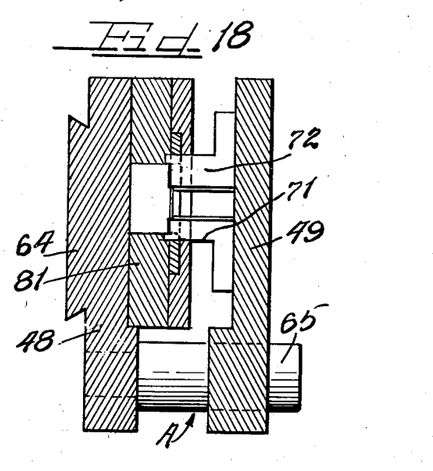
Figure 18 is a section on plane XVIII—XVIII of Figures 13 and 15.
Figure 19:
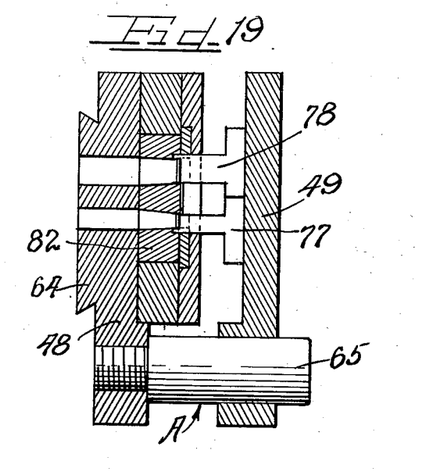
Figure 19 is a section on plane XIX—XIX of Figures 13 and 15.

Figures 13 and 18 show the shearing members 71 and 72 which shear along the lines 73 and 74 (Figure 4) to entirely cut out the tongues for the link loops 44 and 43, respectively, and at the same time the portions 75 and 76 of the band are partially extruded, Figures 13 and 19 showing the punch members 77 and 78 for punching out the portions 75 and 76 from the band.

Figure 14:
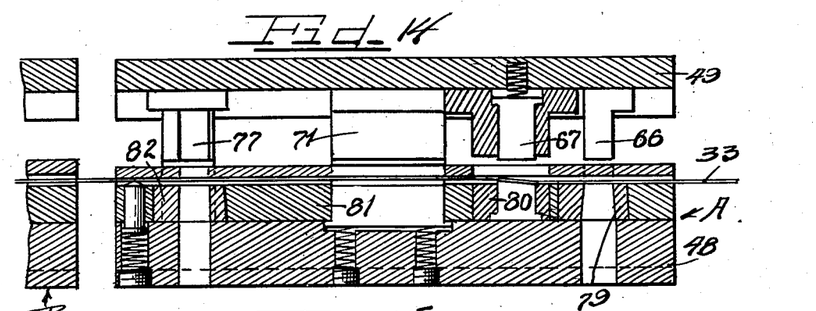
Figure 14 is a horizontal section of the first die assembly on plane XIV—XIV of Figure 13 showing the die assembly open.
Figure 15:
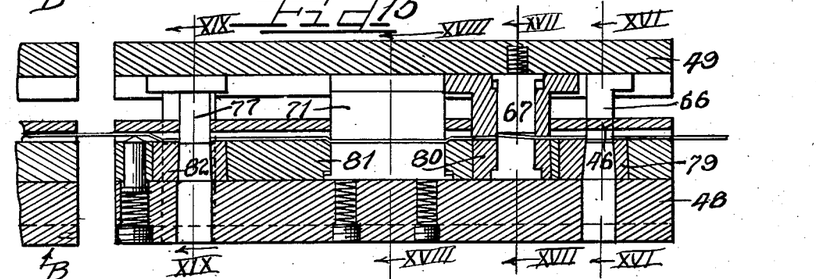
Figure 15 is a section similar to Figure 14 showing the die assembly closed.

As shown on Figures 14 to 19, the stationary die element 48 mounts a die 79 for cooperation with the punch member 66, a die 80 for cooperation with the punch members 67 and 68, a block 81 for cooperation with the shearing members 71 and 72, and a die 82 for cooperation with the punch members 77 and 78. Figure 14 shows the die structure open while Figures 15 to 19 show the die structure closed for performance of the various die operations referred to.

The die assembly B is shown on Figures 20 to 23. The movable element 55 is mounted on bars 83 on which it is reciprocated by operation of the cam 59. The die assembly B receives the band from the assembly A, the movable or punch element 55 having the holding member 84 which engages in the holes 46 in the band to hold the band aligned in the assembly. On the element 55 is a forming die member 85 which cooperates with the die member 86 in the stationary element 54 to deflect the body portion 42 of the links for transverse curvature and, at the same time, to offset the middle portion 42' of the body part from which extends the tongue for forming the hinge loop 45 of the links, the curvature of the body being to the radius of the loop 45 when completed. The seat block 87 for the die member 85 has a forming bead or ridge 88 thereon just in advance of the die member 85 for cooperating with the die channel 89 in the seating block 90 for the die member 86 for forming a V-shaped channel 91 transversely in the link at the bases of the tongues from which the loops 43 and 44 of the link are to be formed.

Figures 20, 20A, 20B:
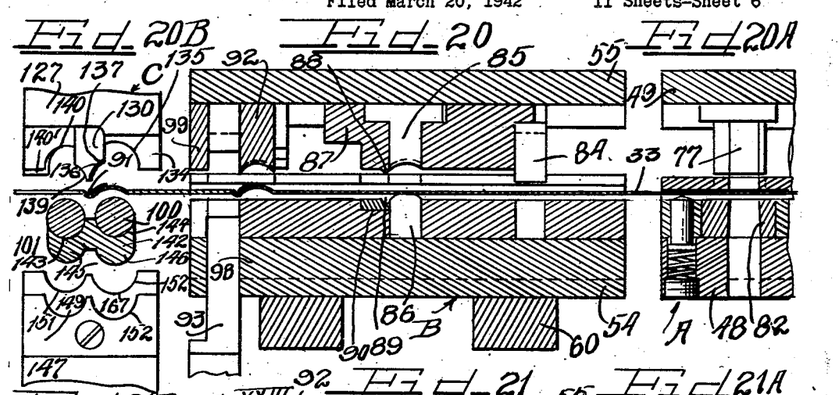
Figure 20 is a horizontal section on plane XX—XX of Figure 8 of the secondary assembly in open position.
Figure 20a shows the end of the first die assembly from which the ribbon passes into the die assembly of Figure 20.
Figure 20b shows portions of the third die assembly for receiving embryo link from the second die assembly.
Figures 21, 21A, 21B, 22, 23:
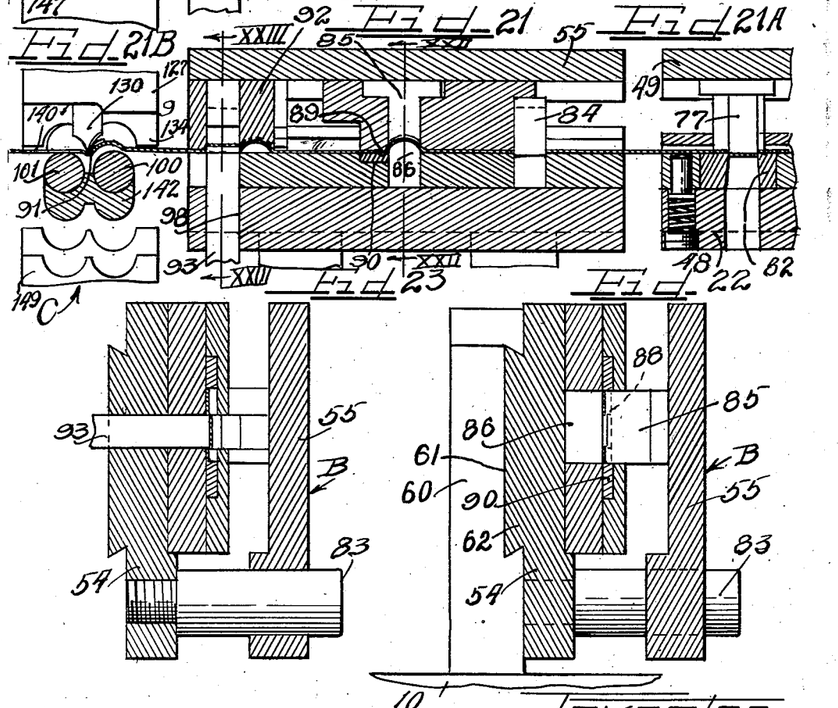
Figures 21, 21a, and 21b correspond with Figures 20, 20a, and 20b and show the dies closed and embryo link being several from the band, with the die structure 21b engaging the severed link to hold it in place for die operation to form the loops.
Figure 22 is a section on plane XXII—XXII of Figure 21.
Figure 23 is a section on plane XXIII—XXIII of Figure 21.

After the next feed shift of the band through the die assembly B, the holding element 92 on the punch element 55 comes into engagement with the transversely bent body part of the link and cutter mechanism then functions to cut out the tie portion 47 (dotted lines on Figure 4) between the body 42 of the link and the end of the tongue of the preceding link which, at this time, has been advanced into the field of operation of the third die assembly C, as shown on Figures 20 and 21.

The cutting mechanism and its operation is best shown on Figures 1, 8, 20, 21, and 23. A shearing blade 93 is slidable in the stationary die element 54 and is operated at the proper time from a cam disk 94 on the shaft 17 whose cam channel 95 engages a cam pin 96 on the arm 97 extending from the cutter blade. The cutter blade moves through the passageway 98 which aligns with the passageway 99 in the holding assembly 92, so that, when the cutting blade is shifted inwardly by its cam, the tie portion 47 is cut out of the band for release of the link, which is now in the field of operation of the die assembly C.

Referring to Figure 4, the link at the left end is the link which results from the die and forming operation in the assemblies A and B.

It is to be understood, of course, that the operation of the band feed controlling cam 41 is timed relative to the operation of the cams 53 and 59 for the die assemblies A and B and the cutter operation controlling cam 94 so that feed of the band occurs only after each die and forming operation of the assemblies A and B and operation of the cutter blade.

The details of construction and operation of the die assembly C is shown on Figures 24 to 39. The loops of successive links are progressively formed around a pair of mandrels or arbors 100 and 101 supported in vertical parallel relation by a block 102 held by a supporting frame or bracket 103 secured on the bed 10. The arbor 100 is rigidly mounted in the block 102 and extends downwardly therefrom. The arbor 101 is rigidly secured in the lower end of the bore 104 in the block 102, the arbor being tubular for reception of a rod 105 which supports at its lower end a forming head 106 of the same diameter as the arbor 101 and which terminates in a reduced end 107. The rod 105 at its upper end is secured by a pin 108 to a cap member 109, a spring 110 within the bore 104 tending to hold the cap 109 outwardly with the head 106 on the rod in engagement with the lower end of the arbor 101.

Figures 9, 10, 11, 12:
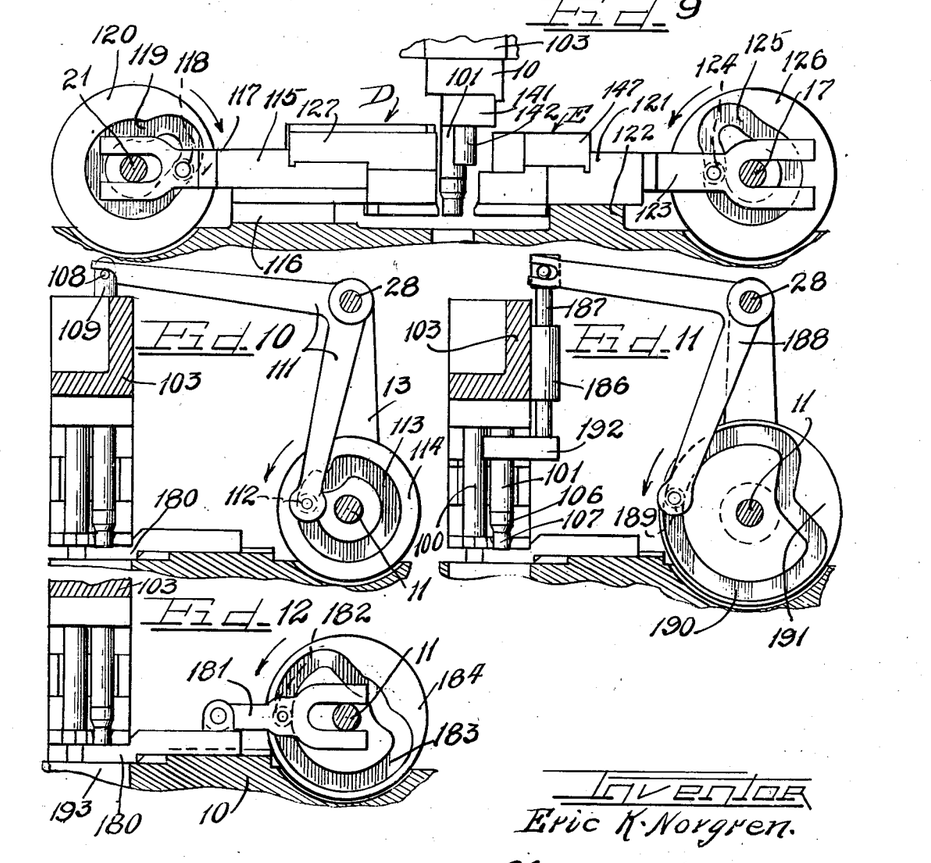
Figure 9 is a section on plane IX—IX of Figure 1.
Figure 10 is a section on plane X—X of Figure 1.
Figure 11 is a section on plane XI—XI of Figure 1.
Figure 12 is a section on plane XII—XII of Figure 1.

Referring to Figures 1 and 10, a bell crank lever 111 fulcrumed on the shaft 28 has its laterally extending arm engaging at its end against the top of the pin 108, and the downwardly extending arm of the lever journals a cam roller 112, which engages in the cam channel 113 in the cam disk 114 mounted on the shaft 11. The rod 105, for the greater part of the operation of the machine, is held in its upper position by the spring 110, as shown on Figure 28a, and at a predetermined time, the cam 114 will operate the lever 111 for downward shift of the rod 105, as shown on Figure 28.

At opposite sides of the lower ends of the arbors 100 and 101 are cooperable die structures D and E. These die structures are movable toward and away from the arbors in a direction of right angles with the plane through the axes of the two arbors. The die structure D comprises a supporting body 115 slidable on a supporting table 116 on the bed 10 and has an arm 117 extending therefrom which is bifurcated at its end to receive the shaft 21 and which carries a cam roller 118 engaging in the cam channel 119 of the cam disk 120 on the shaft 21.

The die structure E comprises the body part 121 slidable on the table 122 on the bed 10 and having the arm 123 extending therefrom for straddling the shaft 17 and having the cam roller 124 engageable in the cam channel 125 in the cam disk 126.

Figure 28:
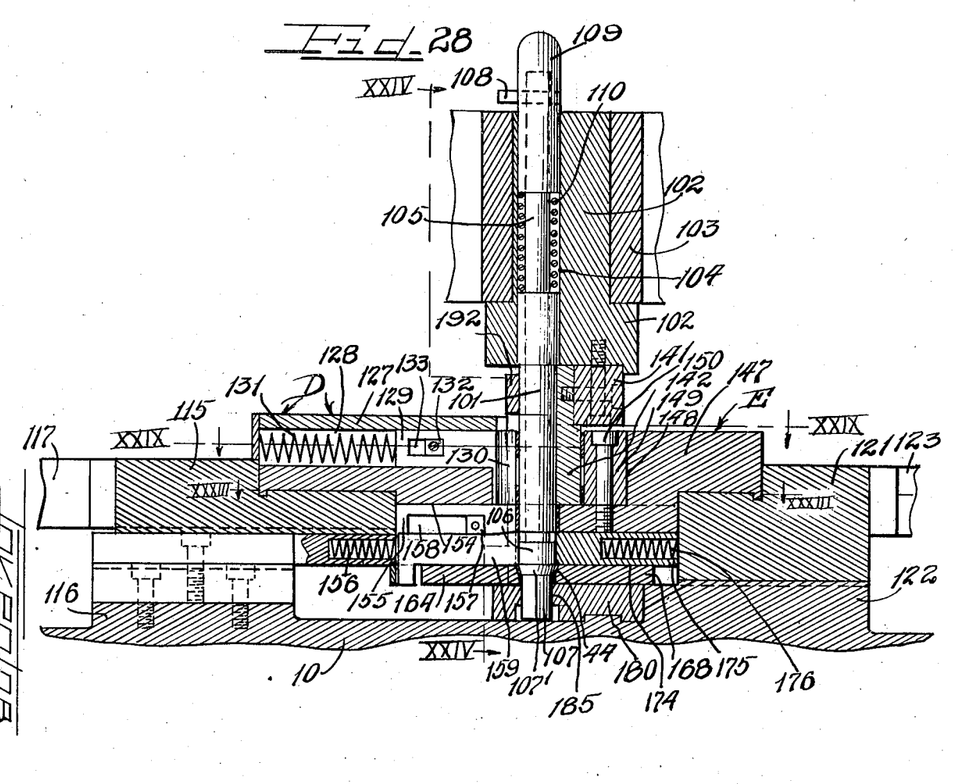
Figure 28 is an enlarged section on plane XXVIII—XXVIII of Figure 1 and a section on plane XXVIII—XXVIII of Figure 24.
Figures 29, 29A, 30, 30A, 31, 32:
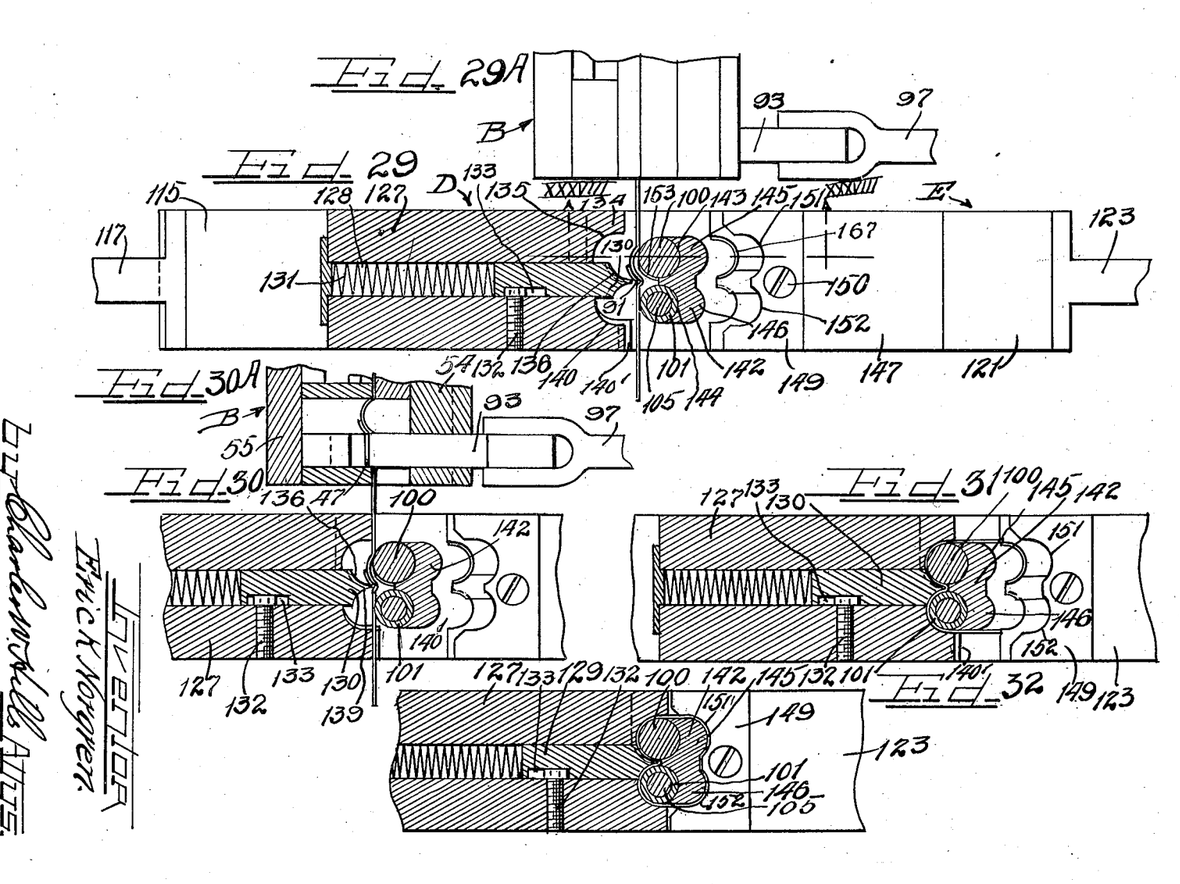
Figure 29 is a section on plane XXIX—XXIX of Figure 28 showing the third die assembly open for receiving an embryo link from the second die assembly.
Figure 29a is a plan view of the end of the second die assembly.
Figure 30 is a section similar to Figure 29 showing the third die assembly partly closed to clamp the received embryo link in position for loop forming.
Figure 30a is a horizontal section of the end of the second die assembly in closed position and the cutter for cutting off the embryo link from the band.
Figure 31 is a similar section showing the initial loop forming by the third die assembly.
Figure 32 is a similar section showing the die assembly closed for completing the partial formation of the link loops.
Figure 33:
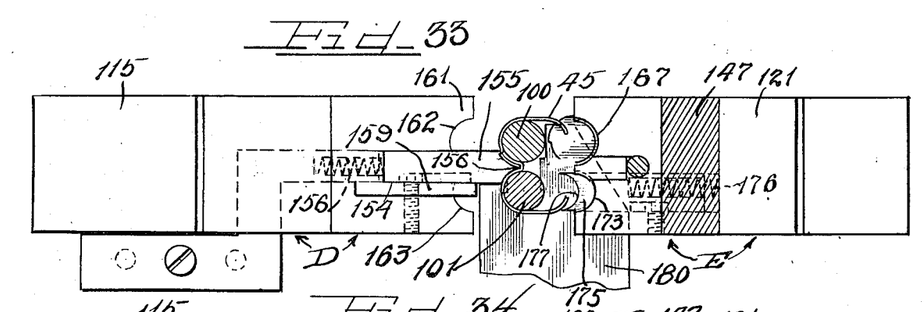
Figure 33 is a section on plane XXXIII—XXXIII of Figure 28 showing the third die assembly open preparatory for final deflection of the link loops to circular form.
Figure 34:
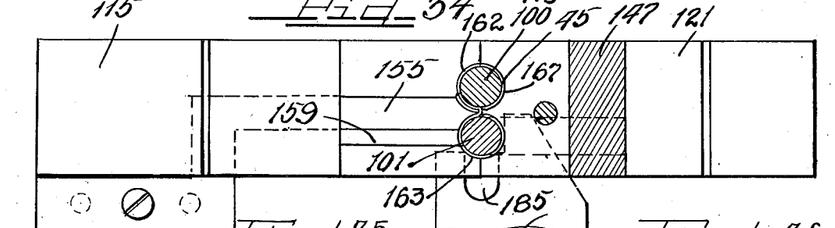
Figure 34 is a similar view showing the assembly closed and the loops finally formed.
Figure 35:
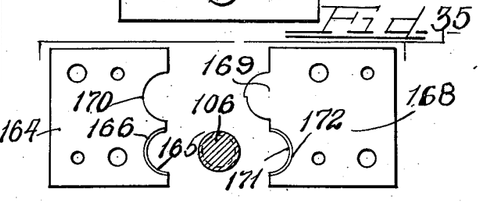
Figure 35 is a plan view of the die members, in open position, for giving the tapered form to the smaller loop on the link.
Figure 36:
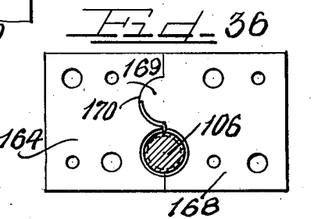
Figure 36 shows the die members closed.
Figure 38A:
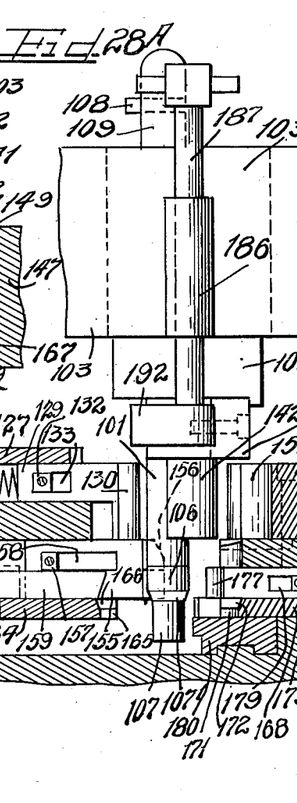
Figure 38 is a section on plane XXXVIII—XXXVIII of Figure 29, the die structure being open.
Figure 39:
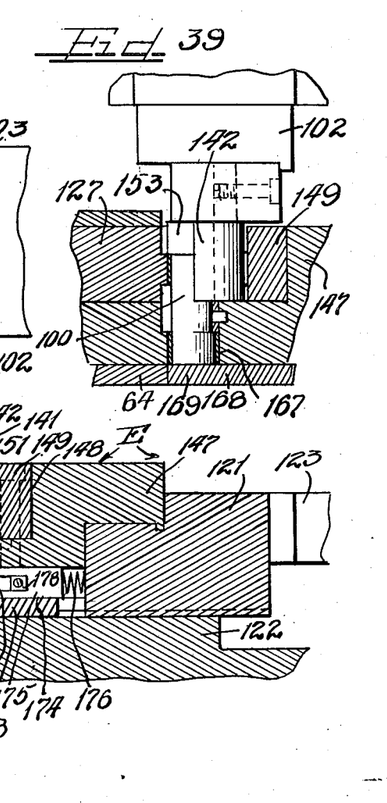
Figure 39 is a similar view showing the die structure closed.

Rigidly mounted on the body 115 of the die structure D and extending forwardly therefrom is a die block 127 having the rectangular passageway 128 therein for receiving and guiding the rear end 129 of the link holding head 130, whose outer end is tapered, as clearly shown on Figures 20b and 29, for engagement in the holding channel 91 in the link after it has been severed from the stock strip in the die assembly B. A spring 131 tends to urge the holder outwardly and such outward movement is limited by the engagement of the abutment 132 on the block 127 with the end of the slot 133 in the holder. Figure 28a shows the die structure D in its outer position with the holder 130 held in its outer position by the spring, and Figure 28 shows the die structure D in its inner or operating position with the holder pressed by the spring with its end in the holding channel 91 on a link.

Figures 27, 37:
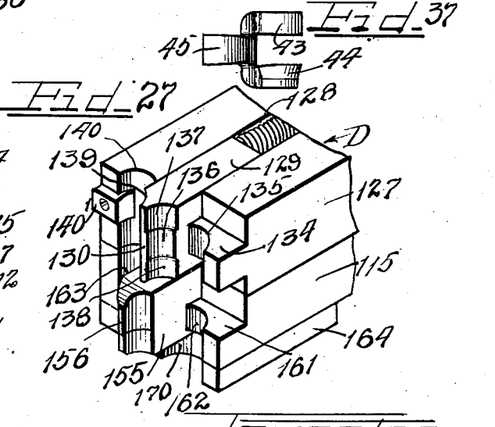
Figure 27 is a perspective view of the end portion of the forming element of the third die assembly.
Figure 37 shows a finished link which has been discharged from the third die assembly.

Referring to Figures 20b, 27, and 29, at the inner end of the die block 127 a forming tongue 134 extends which has its inner corner concave to form a quarter turn forming surface 135. The face 136 of the holder 130, adjacent to the tongue 134, is concave to a quarter turn and is opposed to the surface 135 on the tongue, while the ends 137 and 138 are offset from the center surface 135 to substantially the thickness of the metal of the links to be formed. The opposite face 139 of the end of the holder 130 is also of arcuate cross contour to the extent of substantially a quarter of a circle.

At its other side, the die block 127 has the corner adjacent to the holder 130 cut away to form a cylindrical forming surface 140 of substantially 90° extent, and midway between the top and bottom of the block, a spacer piece 140' is secured to the block to project forwardly from the end thereof. As will be described more in detail later, when the die structure D is shifted inwardly, the holder edge engages in the channel 91 in the link to hold the link in proper position against the arbors preparatory to formation of the link loops.

As best shown on Figures 28 and 28a, a supporting bar 141 is secured to the lower end of the arbor supporting block 102, and secured to and depending from the inner side of this bar 141 is a forming member 142 which, as shown on Figures 20b and 29, has on its inner side the channels 143 and 144 of substantially semi-circular cross-section for receiving the arbors 100 and 101, respectively, the forming member at its outer side or back having the projections 145 and 146 presenting surfaces of substantially semi-cylindrical shapes.

Rigidly mounted on the body 121 of the die structure E is the die block 147 which has the recess 148 in which is secured the die piece 149 as by a screw 150. This die piece at its outer end presents substantially semi-cylindrical die surfaces 151 and 152 in opposition to the surfaces on the back of the former 142. Referring to Figures 26 to 32, inclusive, the die blocks 127 and 147 are horizontally opposed to each other at opposite sides of the arbors 100 and 101. When the die structure bodies 115 and 121 are shifted inwardly by the cams 120 and 126, the end of the holder 130 enters the holding channel 91 in the link, and as the die body 115 continues, the spring 131 will exert pressure against the holder 130 so that it will hold the link firmly in proper position against the arbors 100 and 101, as shown on Figure 30. The abutment 132 on the die block 127 then comes into engagement with the front end of the slot 133 in the holder 130 and the holder then moves positively with the die block. The die block 127 will then come into engagement with the link, the tongue 134 on the die block engaging the hinge forming loop tongue of the link and the other side of the die block engaging the two cartridge holding loop forming tongues, and the tongues are deflected around the arbors and along the sides of the former 142, as shown on Figure 31, the spacer piece 140' on the die block 127 engaging between the two tongues to hold them properly spaced during formation thereof. After such partial formation of the tongues, the die block 147 becomes effective for engagement of the die piece 149 with the ends of the tongues to deflect them against the forming surfaces on the back of the former 142, as shown on Figure 32, the link then being in its intermediate form, shown on Figure 5. During this formation of the link, the middle or higher portion 136 on the holder 130 engages in the inwardly directed depression 42' of the link while the deeper outer portions 137 and 138 receive the portions of the link body 42 adjacent to the depression, raised portion 153 on the arbor 100 being opposed to the holder surface 137, as shown on Figures 38 and 39.

Figure 5:
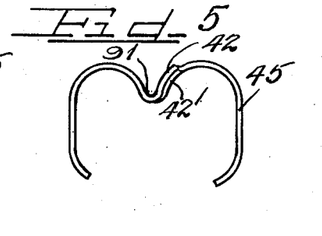
Figure 5 is a side view of a link with its loops partially formed.
Figure 6:
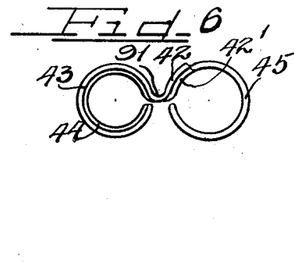
Figure 6 is a side view of a finished link.
Figure 7:
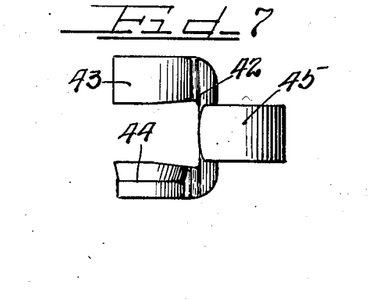
Figure 7 is a view of a finished link looking upwardly from below Fig. 6.

The partially formed link, shown on Figure 5, will now be moved downwardly into a lower die field for final formation of the link tongues into the loops. This transfer of the links from the upper die field into the lower die field is accomplished by stripper mechanism to be referred to later.

Referring to Figures 27, 28, 28a, and 33, a guide channel 154 is provided in the inner end of the die body 115 below the die block 127 and in this channel a holding member 155 is shiftable, a spring 156 tending to shift it outwardly toward the arbors 100 and 101 with its end 156 (Figure 27) in alignment with the holding channel 91 in the link so as to guide the link partially formed in the upper die field into proper position in the lower die field. An abutment 157 on the body 115 cooperates with the slot 158 in the holding member for limiting its longitudinal movement.

Figure 28a shows the die structures apart and the holding member 155 in its outermost position and, as shown on Figure 28, when the die structures are brought together for their forming operation, the abutment 157 will engage the end of the slot 158 so as to force the holding member against the link to hold the link in proper position for the final forming operation.

At one side of the holder 155, a spacer plate 159 is slidable in the channel 154, this spacer plate being yieldably held in a forward position by means of a spring 160 for engagement between the pair of loop forming tongues on the link so as to hold them properly spaced while the tongues are being finally bent into circular form, the plate being abutted by the cam body 115 during forming so as to be held rigidly between the loop forming tongues, as shown on Figure 28.

Adjacent to one side of the holder member 155, the body 115 has the tongue 161 provided with the forming surface 162, and at the opposite side of the member 155, the body 115 presents the forming surface 163, the surfaces 162 and 163 engaging respectively with the hinge loop forming tongue and the cartridge holder loop forming tongues during final formation of the link.

Secured to the die block 115 to bottom the channel 154 is a die plate 164 (Figures 27, 35, and 36) which has the semi-circular forming surface 165 whose upper portion 166 is beveled (Figures 28 and 28a), which surfaces cooperate with the end 107 and the beveled surface 107' on the head 106 at the lower end of the rod 105 in the formation of the loop 44 of the link (Figure 7), as will be explained more in detail later.

Referring to Figure 26 and Figures 28 to 34, the die block 147 of the die structure E has the semi-circular forming surface 167 opposed to the forming surface 162 of the die structure D for final forming of the link tongue into the hinge loop 45 when the die structures are brought together. Secured to the bottom of the die block 147 is the die plate 168, which, below the forming surface 167, has the cylindrical part 169 for engagement with the surface 170 in the die plate 164 of the die structure D when the die structures are brought together, this part 169 forming a seat for the forming arbor 100 during the forming operation. The die plate 168 has also the semi-circular surface 171 with the bevel surface 172 at the upper end thereof, these surfaces cooperating with the surfaces 165 and 166 on the die plate 164 in the formation of the loop 44 of the link around the head 106 at the lower end of the bar 105 which extends through the arbor 101.

Above the surface 171 in the die plate 168, the die block 147 has the surface 173 for cooperating with the surface 163 on the die structure D to form the link loop 43 around the arbor 101. Between the die plate 168 and the surface 173, the die block 147 has the guide passageway 174 for a spacer bar 175 urged outwardly by a spring 176 (Figure 28a), the outer end of the bar having the semi-circular surface 177 for engaging the forming head 106 between the tongues for the link loops 43 and 44 to hold these tongues properly spaced apart during final formation thereof. An abutment 178 on the die block 147 engages in slot 179 in the spacer bar 175 to limit its outward movement by the spring 176, the spacer bar, during closure of the die structures, being held against the arbor head 106 by the pressure of the spring, and as the die structures are finally brought together, the abutment 178 engages with the inner end of the slot 179 to forcibly hold the spacer bar in spacing position. This spacer bar 175 in the die structure E, together with the spacer bar 159 in the die structure D, will hold the loop forming tongues in proper spaced relation during the final forming thereof into the loops 43 and 44.

As has been before explained, the head 106 on the bar 105 of the arbor 101 is normally in its upper position as shown on Figure 28a. As the die structures D and E are brought together for final forming of the link, the bar 105 is shifted downwardly by operation of the cam 114 (Figure 10) so that, as the die plates 164 and 168 come together to form the lower part of the link loop 44 around the end 107 on the head 106 (Figure 28), the head 106 shifts downwardly for application of its beveled surface 107' against the upper part of the link 44 to flare this part against the beveled surfaces 166 and 172 of the die blocks 164 and 168, respectively. During closure movement of the die structures D and E, a supporting plate 180 (Figures 28, 28a, 33 and 34) is in supporting position below the forming ends of the die structures, this plate being slidable on the bed 10 and having the cam arm 181 (Figure 12) extending therefrom with a cam roller 182 engageable in the cam channel 183 of the cam disk 184, which is mounted on the shaft 11. The supporting plate has the passageway 185 extending inwardly from its end and of a width to receive the end 107 of the arbor head 106 (Figure 34), and when the plate is in its inner or supporting position, the inner end of the channel 185 will receive the end 107, and the link, during final formation thereof, will rest with its loop 44 on the supporting plate so that the plate will take up the pressure of the head 106 when it is shifted downwardly to cooperate with the die plates 164 and 168 to form the loop 44.

Figures 24, 25:
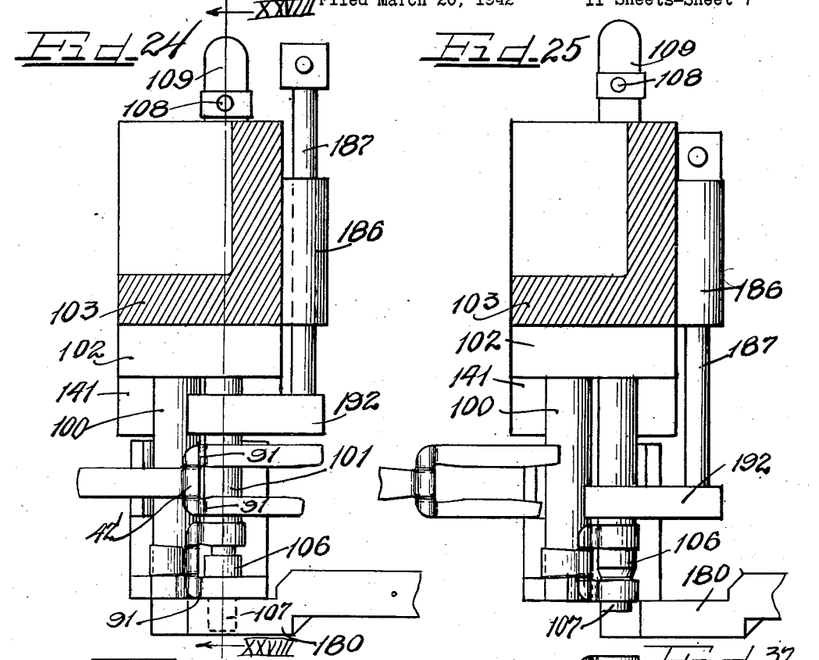
Figure 24 is an enlarged section on plane XXIV—XXIV of Figure 1 and also a section taken on plane XXIV—XXIV of Figure 28.
Figure 25 is a view similar to Figure 24 showing the link after partial formation of its loops in the upper forming plane and downward shift of the link into the lower forming plane for final forming of the loops.
Figure 26:
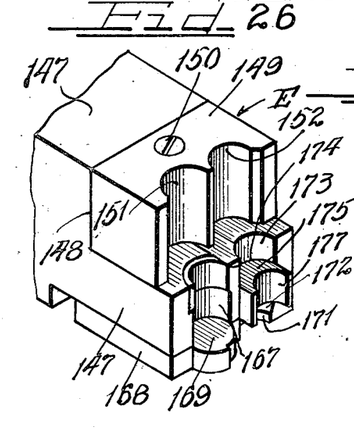
Figure 26 is a perspective view of the end portion of the holding and forming element of the third die assembly.

After final formation of the link, it is ready for ejection from the machine. The ejector mechanism is best shown on Figures 1, 11, 24, and 25. On the front of the supporting bracket 103 is a lug 186, in which the stripper bar 187 is shiftable vertically by a cam lever 188 having the cam roller engageable in the channel 190 in the cam disk 191 on the shaft 11. At its lower end the stripper bar 187 carries the stripper arm 192, which extends into engagement with the forming arbors 100 and 101 above the link in the upper forming field, the stripper being normally in its upper position as shown on Figure 24. After downward movement of the rod 105 by the cam 114 for final formation of the link, and upward return movement of the bar, the cam 184 becomes effective to withdraw the supporting bar 180, the came 191 then effecting downward shift of the stripper bar for engagement of the stripper arm 192 with the upper edge of the partially formed link in the upper forming field, the downward pressure on this link being communicated to the finished link in the lower forming field for ejection of the finished link through the discharge opening 193 (Figure 12) in the bed 10, it being understood that cams 120 and 126 having become effective to withdraw the die structures D and E before such ejection operation. The partially formed link will now be in the lower forming field, having been guided into this field by the holder 155 in the lower forming field, the link being then supported by engagement of its partially formed tongue 44 with the top of the support plate 180. Figure 24 shows the forming head 106 down for the final link forming operation and with the support plate 180 in supporting position, another link having been fed into the upper forming field. Figure 25 shows the operation of the stripper mechanism after shifting the partially formed link down from the upper forming field into the lower forming field, and the ejection of the finished link (Figure 37). After withdrawal of the stripper mechanism, the supporting bar 180 will be shifted back into its supporting position.

I have thus produced an improved method and means for efficiently and economically making metallic cartridge belt links of the type referred to. I do not, however, desire to be limited to the exact construction, arrangement, and operation shown and described, as changes and modifications may be made without departing from the scope of the invention.

I claim as follows:

1. A machine for producing by progressive stages metallic cartridge belt links of the type described from flat plate strip, comprising in combination a first, a second and a third die assembly, power means for operating said die assemblies in synchronism with each other, means adapted to feed the flat plate strip progressively through said die assemblies, punching means in the first die assembly adapted to form a pair of spaced openings in the flat strip plate within the confines thereof, means in said first die assembly and spaced from said punching means in the direction of feeding movement of the flat plate strip for cutting the links in substantially flat condition out of sheet metal stock with the tongues from which the hinge loops of the links are to be formed each joined at their ends to the body portion of the succeeding link, said punching means cooperating with said openings for holding said strip accurately aligned in said first die assembly during operation by said cutting means, means in said second die assembly effective during such formation of the link to define a transverse holding channel at the base of the link tongues from which the cartridge holding loops are to be formed, a holding means in the second die assembly for engaging the spaced openings of the strip for maintaining the same accurately aligned in said second die assembly during operation of the means forming the transverse holding channel, said third die assembly comprising a pair of arbors and die structures cooperable therewith, holding means on one of said die structures engageable in said holding channel of a link to hold said link properly aligned on said arbors preparatory to forming engagement of said die structures with the link, and forming elements on said die structures cooperable to bend the two tongues on the link around one of said arbors into circular or loop form and the other tongue around the other arbor into circular or loop form to produce the finished link.

2. A machine for producing by progressive stages metallic cartridge belt links of the type described from flat plate strip, comprising means for cutting a link blank in substantially flat form out of sheet metal stock with the tongues from which the hinge loops of the links are to be formed each joined at their ends to the body portion of the succeeding link and during such forming defining a transverse holding channel in the link at the base of the pair of tongues from which the cartridge receiving loops are to be formed, a forming assembly for receiving the flat links, said forming assembly comprising a pair of forming arbors and a pair of die structures cooperable therewith and having two forming fields, feeding means for moving the flat links from the cutting means to the forming assembly, power means for actuating said cutting means, die structures and feeding means in synchronism with each other, holding means on one of said die structures engageable with a fed-in flat link to engage in said transverse holding channel to hold the link in the first forming field properly aligned on said arbors while said die structures are being brought together, forming elements on said die structures effective in the first forming field to cooperate with said arbors to partially bend the link tongues into circular form, means driven by said power means in timed relation with said feeding means for shifting the partially formed link along said pair of forming arbors from said first field into the second field, and elements on said die structures cooperable with said arbors in said second field for final bending of the tongues into circular form to produce the finished link.

3. A machine for producing by progressive stages metallic cartridge belt links of the type described from flat plate strip, comprising a cutting die structure, means for progressively feeding a metal band in a vertical plane through said die structure for progressive cutting from said band of links in substantially flat form with the tongues from which the hinge loops of the links are to be formed joined at their ends to the body portion of the succeeding link and with a transversely extending holding channel therein adjacent to the bases of the pair of tongues from which the cartridge holding loops are to be formed, a forming assembly comprising a pair of vertical arbors and die structures cooperable therewith, said forming assembly being disposed to receive between said arbors and one of said die structures a link in flat form from said die structure, feeding means for moving the flat links from the cutting die structure to the forming assembly, power means for actuating said cutting die structure, forming assembly die structures and feeding means in synchronism with each other, holding means on said one of said forming assembly die structure engageable in the holding channel of a fed-in flat link while said die structures are being brought together for holding said link in proper position against said arbors, means driven by said power means in timed relation with said feeding means for moving the fed-in link along said arbors in successive stages and forming elements on said forming assembly effective when said forming assembly die structures are finally brought together to progressively bend the tongues of the links around said arbors, at the successive stages of movement along the same, into circular form to produce the finished link.

4. In the art of forming cartridge belt links of the type described, each having a tongue from which the hinge loop is formed, tongues from which the cartridge holding loops are formed and a body portion, with all of said tongues being joined at one of their ends to said body portion, the method which comprises cutting from metal strip a succession of blanks each having said tongues and said body portion joined as aforesaid but with the hinge loop tongue of one of two adjacent blanks making connection with the body portion of the other of said adjacent blanks, thereafter severing said connection to separate a blank and bending said tongues of the separated blank to form said loops.

5. In the art of forming cartridge belt links of the type described, each having a tongue from which the hinge loop is formed, tongues from which the cartridge holding loops are formed and a body portion, with all of said tongues being joined at one of their ends to said body portion, the method which comprises cutting from metal strip a succession of blanks each having said tongues and said body portion joined as aforesaid but with the hinge loop tongue of one of two adjacent blanks making connection with the body portion of the other of said adjacent blanks, transversely curving the body portion of one of said adjacent blanks substantially to the curvature of the hinge loop subsequently to be formed, thereafter severing said connection to separate said last mentioned blank and bending said tongues of the separated blank to form said loops.

6. In the art of forming cartridge belt links of the type described, each having a tongue from which the hinge loop is formed, two tongues from which the cartridge holding loops are formed and a body portion, with all of said tongues being joined at one of their ends to said body portion, the method which comprises cutting from metal strip a succession of blanks each having a body part corresponding to said body portion, two spaced and substantially parallel tongues from which cartridge holding loops are to be formed joined to one side of said body part, and a tongue from which a hinge loop is to be formed joined to the opposite side of said body part and so proportioned, positioned and cut with reference to a like succeeding blank that it remains in connection with the body part of said succeeding blank and lies between the two tongues of said succeeding blank from which cartridge holding loops are to be formed, severing the said connection to separate a blank and bending said tongues of the separated blank to form said loops.

7. In the art of forming cartridge belt links of the type described, each having a tongue from which the hinge loop is formed, two tongues from which the cartridge holding loops are formed and a body portion, with all of said tongues being joined at one of their ends to said body portion, the method which comprises cutting from metal strip a succession of blanks each having a body part corresponding to said body portion, two spaced and substantially parallel tongues from which cartridge holding loops are to be formed joined to one side of said body part, and a tongue from which a hinge loop is to be formed joined to the opposite side of said body part and so proportioned, positioned and cut with reference to a like succeeding blank that it remains in connection with the body part of said succeeding blank and lies between the two tongues of said succeeding blank from which cartridge holding loops are to be formed, transversely curving the said body part of a blank before separation from a succeeding blank, severing said connection to separate the blank with the transversely curved body portion, and bending the said tongues of the separated blank to form the said loops.

8. The method of progressively forming cartridge belt links from a strip of metal having a predetermined width coextensive with the length of the body portion of the completed link, which comprises the steps of simultaneously shearing and piercing said strip at predetermined spaced points to partially form a pair of adjacent links in said strip, again shearing said strip to form additional portions of said adjacent links, removing metal from within the longitudinal edges of said strip to further the formation of the said links, preforming a portion of one of the links and simultaneously moving said portion relative to the adjacent link while both of said links remain an integral part of said strip, and thereafter cutting said strip transversely to sever the preformed link from said strip.

ERIC K. NORGREN.

REFERENCES CITED

The following references are of record in the file of this patent:

UNITED STATES PATENTS

| Number | Name | Date |
|---|---|---|
| 1,796,594 | Dull | Mar. 17, 1931 |
| 2,266,997 | Sherman | Dec. 23, 1941 |
| 1,796,593 | Dull | Mar. 17, 1931 |
| 1,584,793 | Morehead | May 18, 1926 |
| 2,155,626 | Weiss | Apr. 25, 1939 |
| 2,293,715 | Crane | Aug. 25, 1942 |
| 1,157,175 | Osswald | Oct. 19, 1915 |